(12) United States Patent
Lee et al.

(10) Patent No.: US 12,549,363 B2
(45) Date of Patent: Feb. 10, 2026

(54) ENCODING OR DECODING FOR APPROXIMATE ENCRYPTED CIPHERTEXT

(71) Applicant: CRYPTO LAB INC., Seoul (KR)

(72) Inventors: Younho Lee, Seoul (KR); Seong-Min Hong, Yongin-si (KR)

(73) Assignee: CRYPTO LAB INC., Seoul (KR)

( * ) Notice: Subject to any disclaimer, the term of this patent is extended or adjusted under 35 U.S.C. 154(b) by 586 days.

(21) Appl. No.: 17/906,856

(22) PCT Filed: Jan. 19, 2021

(86) PCT No.: PCT/KR2021/000718
§ 371 (c)(1),
(2) Date: Sep. 20, 2022

(87) PCT Pub. No.: WO2021/206275
PCT Pub. Date: Oct. 14, 2021

(65) Prior Publication Data
US 2023/0216676 A1    Jul. 6, 2023

(30) Foreign Application Priority Data
Apr. 8, 2020 (KR) .................. 10-2020-0042957

(51) Int. Cl.
*H04L 9/30* (2006.01)
*G06F 17/14* (2006.01)
*G06F 17/16* (2006.01)

(52) U.S. Cl.
CPC .......... *H04L 9/3093* (2013.01); *G06F 17/141* (2013.01); *G06F 17/16* (2013.01)

(58) Field of Classification Search
CPC ... H04L 9/3093; H04L 2209/34; H04L 9/008; H04L 2209/046; G06F 17/141; G06F 17/16
See application file for complete search history.

(56) References Cited

U.S. PATENT DOCUMENTS

| | | | |
|---|---|---|---|
| 10,778,409 B2 | 9/2020 | Cheon et al. | |
| 2002/0170018 A1 | 11/2002 | Cox et al. | |
| 2015/0318991 A1 | 11/2015 | Yasuda et al. | |
| 2018/0212750 A1* | 7/2018 | Hoffstein | G06F 17/16 |
| 2020/0151356 A1* | 5/2020 | Rohloff | G06F 21/6245 |

FOREIGN PATENT DOCUMENTS

| | | | |
|---|---|---|---|
| KR | 20180013064 A | * | 2/2018 |
| KR | 101965628 B1 | | 4/2019 |

OTHER PUBLICATIONS

Cheon et al., Towards a Practical Cluster Analysis over Encrypted Data, 2019. (Year: 2019).*

(Continued)

*Primary Examiner* — Trong H Nguyen
(74) *Attorney, Agent, or Firm* — Steinfl + Bruno LLP

(57) ABSTRACT

Disclosed is an operation device. The operation device includes a memory storing at least one instruction; and a processor configured to execute the at least one instruction, and the processor, by executing the at least one instruction, may perform encoding or decoding for an approximate homomorphic ciphertext using a predetermined matrix having only a half of an element of a matrix corresponding to a canonical embedding function.

17 Claims, 5 Drawing Sheets

(56) References Cited

OTHER PUBLICATIONS

Cheon et al., Bootstrapping for Approximate Homomorphic Encryption, 2018. (Year: 2018).*
Cheon et al., Faster Homomorphic Discrete Fourier Transforms and Improved FHE Bootstrapping, 2018. (Year: 2018).*
Decision to Grant a Patent issued by the Korean Patent Office for KR Patent Application No. 10-2020-0042957 filed on Apr. 8, 2020, on behalf of Crypto Lab Co., Ltd. Issuance date: Feb. 18, 2022. KR Original and Partial English Translation.
International Search Report issued for International PCT Application No. PCT/KR2021/000718 filed on Jan. 19, 2021, on behalf of Crypto Lab Inc. Mail Date: May 6, 2021. KR Original and English Translation. 5 Pages.
Kang, Y., et al., "Trend Analysis of Lightweight Public key Algorithm," *Proceedings of the Korean Institute of Information Scientists and engineers*. Jun. 2009. KR Original and Abstract Translation. 8 Pages.
Notice of Preliminary Rejection issued by the Korean Patent Office for KR Patent Application No. 10-2020-0042957 filed on Apr. 8, 2020, on behalf of Crypto Lab Co., Ltd. Issuance date: Oct. 28, 2021. 9 Pages. KR Original and Partial English Translation.
Written Opinion issued for International PCT Application No. PCT/KR2021/000718 filed on Jan. 19, 2021, on behalf of Cyrpto Lab Inc. Mail Date: May 6, 2021. KR Original and English Translation. 8 pages.
Cheon J. H. et al., "Bootstrapping for Approximate Homomorphic Encryption" *IACR, International Association For Cryptologic Research*, Feb. 2018, 21 pages.
Extended European Search Report for EP Application No. 21784603.9 filed on Jan. 19, 2021 on behalf of Crypto Lab Inc. Mail Date: Mar. 26, 2024 6 pages.
Mayer C. M. "Implementing a Toolkit for Ring-LWE Based Cryptography in Arbitrary Cyclotomic Number Fields" *IACR, International Association For Cryptologic Research*, Jan. 2016, 110 pages.

\* cited by examiner

ENCODING OR DECODING FOR APPROXIMATE ENCRYPTED CIPHERTEXT

CROSS REFERENCE TO RELATED APPLICATIONS

The present application is the U.S. national stage of International Patent Application PCT/KR2021/000718 filed internationally on Jan. 19, 2021, which, in turn, claims priority to Korean Patent Application No. 10-2020-0042957 filed on Apr. 8, 2020.

TECHNICAL FIELD

This disclosure relates to encoding or decoding for approximate encrypted ciphertext, and more specifically, to encoding or decoding that may accelerate polynomial transformation by using a matrix with a smaller size than the related art and applying an efficient operation method in the process of generating or decrypting homomorphic ciphertext.

BACKGROUND ART

With the development of communication technology and more popular distribution of electronic devices, efforts to maintain communication security between electronic devices have continued. Accordingly, encryption/decryption technology is used in most communication environments.

When a message encrypted by encryption technology is sent to a counterpart, the counterpart needs to perform decryption to use the message. In this example, the counterpart may waste resources and time in the process of decrypting the encrypted data. In addition, when a third party hacks while the counterpart temporarily decrypts the message for calculation, there may be a problem in that the message may be easily leaked to the third party.

To solve this problem, homomorphic encryption methods have been studied. According to homomorphic encryption, even if calculation is performed on the ciphertext itself without decrypting the encrypted information, the same result as the encrypted value after calculation on the plain text may be obtained. Accordingly, various calculations may be performed without decrypting the ciphertext.

In that the above encryption process and decryption process for generating the homomorphic ciphertext are processed in a polynomial form, an encoding operation for converting a message vector into a polynomial form and a decoding operation for converting a decrypted text into a message in a polynomial form are required.

In that these encoding and decoding operations require a lot of resources, there is a necessity of a method capable of accelerating the above-described transformation operation in the encoding or decoding process.

DISCLOSURE

Technical Problem

It is an object of the disclosure to address the above-mentioned problems, and provide encoding or decoding that may accelerate polynomial transformation by using a matrix with a smaller size than the related art and applying an efficient operation method in the process of generating or decrypting a homomorphic ciphertext.

Technical Solution

An encoding method according to an embodiment includes receiving a message; and transforming the received message to a polynomial, wherein the transforming to a polynomial may include determining a coefficient of the polynomial using a predetermined matrix having only a half of a matrix corresponding to a canonical embedding function.

The canonical embedding function may be composed of a matrix value having a same size absolute value in a predetermined period.

The canonical embedding function may be composed of a matrix value satisfying Equation of $\zeta_k^j = (e^{2\pi i/2N})^{(5^k \mod 2N)j}$, wherein $\zeta_k^j$ may refer to a matrix value of (k-1, j-1) position, and N is a natural number.

The transforming to the polynomial may include determining the coefficient of the polynomial using inverse Discrete Fourier Transform (iDFT).

The prestored matrix may have a same number or rows and a half of columns with a matrix corresponding to the canonical embedding function.

The method may further include multiplying a scaling factor to the transformed polynomial.

The message is a plurality of message vectors, and the transforming to the polynomial may include transforming the plurality of message vectors to one polynomial.

A decoding method of the disclosure includes receiving an approximate message in a polynomial form decrypted to a secret key; and decoding the received approximate message in a polynomial form; and outputting an approximate message, wherein the decoding may include decoding using a predefined matrix having only a half of an element of a matrix corresponding to a canonical embedding function.

The canonical embedding function may be composed of a matrix value having a same size absolute value in a preset period unit.

The canonical embedding function may be composed of a matrix value satisfying Equation of $\zeta_k^j = (e^{2\pi i/2N})^{(5^k \mod 2N)j}$, wherein $\zeta_k^j$ refers to a matrix value of (k-1, j-1) position, and N is a natural number.

The decoding may include transforming a polynomial coefficient to an approximate message using Discrete Fourier Transform (DFT).

The method may further include dividing a scaling factor for the received approximate message, wherein the decoding may include decoding an approximate message in which a scaling vector is divided.

An operation device according to an embodiment includes a memory storing at least one instruction; and a processor configured to execute the at least one instruction, and the processor, by executing the at least one instruction, may perform encoding or decoding for an approximate homomorphic ciphertext using a predetermined matrix having only a half of an element of a matrix corresponding to a canonical embedding function.

The canonical embedding function may be composed of a matrix value having a same size absolute value in a predetermined period.

The canonical embedding function may be composed of a matrix value satisfying Equation of $\zeta_k^j = (e^{2\pi i/2N})^{(5^k \mod 2N)j}$, wherein $\zeta_k^j$ refers to a matrix value of (k-1, j-1) position, and N is a natural number.

The prestored matrix may have a same number or rows and a half of columns with a matrix corresponding to the canonical embedding function.

The processor may multiply a scaling factor to the transformed polynomial.

The message may be a plurality of message vectors, and the processor may transform the plurality of message vectors to one polynomial.

The processor may perform encoding to transform a received message to a polynomial using inverse Discrete Fourier Transform (iDFT), and performs a polynomial coefficient to an approximate message using Discrete Fourier Transform (DFT).

Effect of Invention

According to various embodiments of the disclosure as described above, the operation complexity in the decoding or encoding process may be affected by the size of the matrix, whereas, in the disclosure, decoding or encoding is performed using a matrix smaller than the related art, thereby reducing the computational complexity and improving operation speed.

BEST MODE FOR CARRYING OUT THE INVENTION

Mode for Invention

Hereinafter, the disclosure will be described in detail with reference to the accompanying drawings. Encryption/decryption may be applied to an information (data) transmission process performed in the disclosure, and expressions for describing the information (data) transmission process in the disclosure and claims should all be construed to include the case of encrypting/decrypting although not mentioned separately. Expression in the form of "transmission (transfer) from A to B" or "reception by A from B" includes transmission (transfer) or reception by an intermediate medium and does not necessarily limited to only directly transmission (transfer) or reception from A to B.

In the description of the disclosure, the order of each step should be understood nonrestrictively unless a preceding step must be performed before a subsequent step logically and temporally. That is, except for the exceptional case above, although a process described as a subsequent step is performed before a process described as a preceding step, it does not affect the essence of the disclosure and the scope of the disclosure should be defined regardless of order of steps. Also, description of "A or B" is defined to mean that both A and B are included, as well as selectively indicating any one of A and B. Also, the term "including" in this specification has a comprehensive meaning to further include another component in addition to elements enumerated to be included.

In this specification, only essential components necessary for the description of the disclosure are described and components not related to the essence of the disclosure are not mentioned. Also, only the mentioned components should not be construed to be included in an exclusive sense but should be construed in a non exclusive sense to include any other component.

In this specification, the term "value" is defined as a concept including not only a scalar value but also a vector.

The mathematical operation and calculation of each step of the disclosure described hereinafter may be realized by a computer operation by a coding method known for corresponding operation or calculation and/or coding devised suitably for the disclosure.

Specific formulas described hereinafter are exemplarily described among various possible alternatives, and the scope of the disclosure should not be construed as being limited to the formulas mentioned in the disclosure.

For convenience of description, the following is assumed.

a←D: element (a) is selected according to distribution (D)

$s_1$, $s_2 \in R$: s1 and s2 are each an element belonging to R set.

mod (q): Modular operation with q elements $\lfloor \cdot \rceil$: Internal value is round off Hereinafter, various embodiments of the disclosure will be described in detail with reference to the accompanying drawings.

Figure 1:
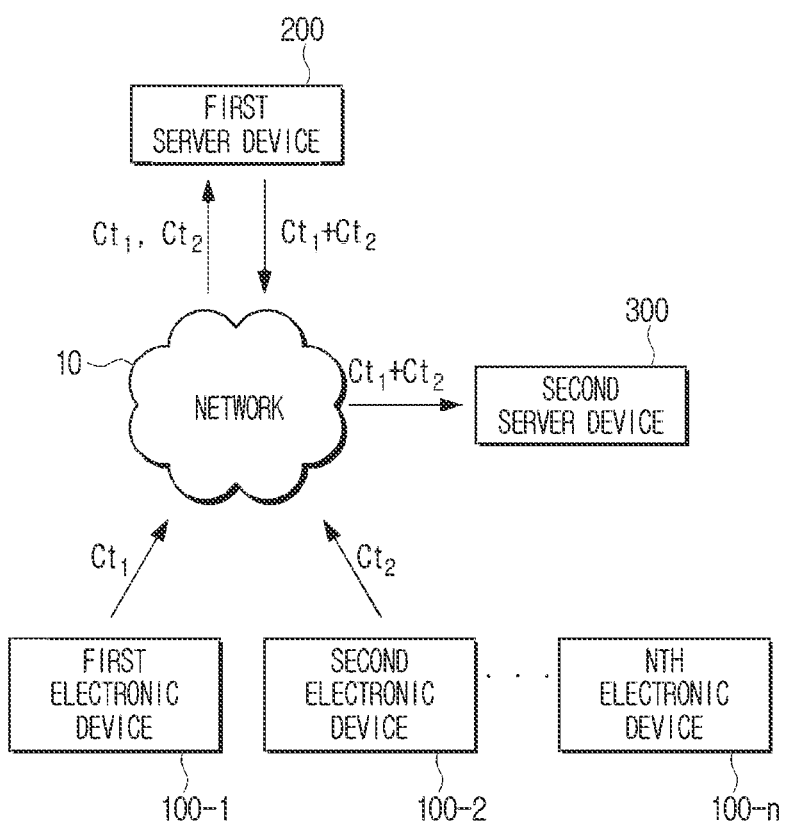
FIG. 1 is a view illustrating a structure of a network system according to an embodiment of the disclosure.

FIG. 1 is a view illustrating a configuration of a network system according to an embodiment of the disclosure.

Referring to FIG. 1, a network system may include a plurality of electronic devices 100-1 to 100-$n$, a first server device 200, and a second server device 300, and these components may be connected to each other via a network 10.

The network 10 may be implemented in various types of wired/wireless communication networks, broadcast communication networks, optical communication networks, cloud networks, and the like, and each device may also be connected by a method such as Wi-Fi, Bluetooth, and near field communication (NFC), and the like, without a separate medium.

In FIG. 1, a plurality of electronic devices 100-1 to 100-$n$ are illustrated but the plurality of electronic devices may not necessarily be used and one device may be used. For example, the electronic devices 100-1 to 100-$n$ may be implemented in various types of devices such as smartphones, tablets, game players, PCs, laptop PCs, home servers, kiosks, and the like, and may also be implemented in the form of a home appliance to which an IoT function is applied.

A user may input various information through the electronic devices 100-1 to 100-$n$ used by the user. The input information may be stored in the electronic devices 100-1 to 100-$n$ but may be transmitted to and stored in an external device for the reason of storage capacity and security. In FIG. 1, the first server device 200 may serve to store such information, and the second server device 300 may serve to use some or all of the information stored in the first server device 200.

Each of the electronic devices 100-1 to 100-$n$ may homomorphically encrypt the input information and transmit the homomorphic ciphertext to the first server device 200. Each electronic device 100-1 to 100-$n$ may transform input information (i.e., message) into a polynomial form (i.e., perform encoding) using a predefined matrix, encrypt the message transformed in a polynomial form to a secret key to generate a homomorphic ciphertext. The predefined matrix may be Equation 14 or Equation 18, which will be described later. Specific encoding and encryption operations will be described later with reference to FIGS. 2 and 3.

In this case, each of the electronic devices 100-1 to 100-n may include encryption noise, i.e., an error, calculated in the process of performing the homomorphic encryption, in the cipher text. The homomorphic cipher text generated by each of the electronic devices 100-1 to 100-n may be generated in a form in which a resultant value including a message and an error value is restored when decrypted later using a secret key.

For example, the homomorphic cipher text generated by the electronic devices 100-1 to 100-n may be generated in a form satisfying the following properties when decrypted using a secret key.

$$Dec(ct,sk)=<ct,sk>=M+e(\mod q) \qquad \text{[Equation 1]}$$

Here, <, > are usual inner products, ct is cipher text, sk is secret key, M is plaintext message, e is an encryption error value, and mod q is Modulus of cipher text. q should be chosen to be greater than a resultant value M obtained by multiplying the message by a scaling factor Δ. If an absolute value of the error value e is smaller enough than M, then a decrypted value M+e of the cipher text is a value that may replace an original message with the same precision in significant digit operation. Among the decrypted data, an error may be disposed on the least significant bit (LSB) side and M may be disposed on a second LSB side adjacent to the error.

If a size of the message is too small or too large, the size of the message may be adjusted using a scaling factor. When the scaling factor is used, even a message in the form of a real number, as well as the form of an integer, may be encrypted, utilization may be significantly increased. In addition, by adjusting the size of the message using the scaling factor, a size of an area in which the messages exist, that is, an effective area, in the cipher text after the operation is performed may also be adjusted.

According to an embodiment, the ciphertext modulus q may be set and used in various forms. For example, the modules of the ciphertext may be set in the form of an exponential power $q=\Delta^L$ of the scaling factor Δ. If Δ is 2, q may be set to a value such as $q=2^{10}$.

The first server device 200 may store the received homomorphic cipher text in the cipher text form, without decrypting the received homomorphic ciphertext.

The second server device 300 may request a specific processing result for the homomorphic cipher text from the first server device 200. The first server device 200 may perform a specific operation according to a request from the second server device 300, and then transmit a result to the second server device 300.

For example, when the cipher texts ct1 and ct2 transmitted from the two electronic devices 100-1 and 100-2 are stored in the first server device 200, the second server device 300 may request the sum of the information provided from the electronic devices 100-1 and 100-2, from the first server device 200. The first server device 200 may perform an operation of summing the two cipher texts according to the request, and then transmit a resultant value ct1+ct2 to the second server device 300.

In terms of the nature of the homomorphic cipher text, the first server device 200 may perform an operation without decryption, and the resultant value is also in the cipher text form. In the disclosure, the resultant value obtained by the operation is referred to as an operation result cipher text.

The first server device 200 may transmit the operation result ciphertext to the second server device 300.

The second server device 300 may decrypt the received operation result cipher text to obtain an operation resultant value of data included in each homomorphic cipher text. For example, the second server device 300 may decrypt the received operation result ciphertext to generate an approximate message for a polynomial form value, and perform decoding on the generated approximate message using a predefined matrix. The predefined matrix may be a matrix corresponding to a canonical embedding function as shown in Equation 14 to be described later, or may be a matrix including only the left element value of a matrix corresponding to the canonical embedding function as shown in Equation 18 to be described later. Specific decoding and decoding operations will be described later with reference to FIGS. 2 and 3.

The first server device 200 may perform an operation several times according to a user request. In this case, the weight of the approximate message in the ciphertext as a result of the operation obtained for each operation is different. When the weight of the approximate message exceeds the threshold, the first server device 200 may perform a bootstrapping operation. As described above, the first server device 200 may be referred to as an operation device in that the device may perform an operation.

If q is less than M in Equation 1 described above, M+e (mod q) has a different value from M+e, and thus decoding becomes impossible. Therefore, the value of q should always be kept greater than M. However, as the operation proceeds, the value of q gradually decreases. Therefore, it is necessary an operation to change the value of q so that it is always greater than M, and this operation is called a bootstrapping operation. As such a bootstrapping operation is performed, the ciphertext may be in a re-operable state.

Meanwhile, although FIG. 1 illustrates a case that the first electronic device and the second electronic device perform encryption and the second server device performs decryption, the disclosure is not necessarily limited thereto.

Figure 2:
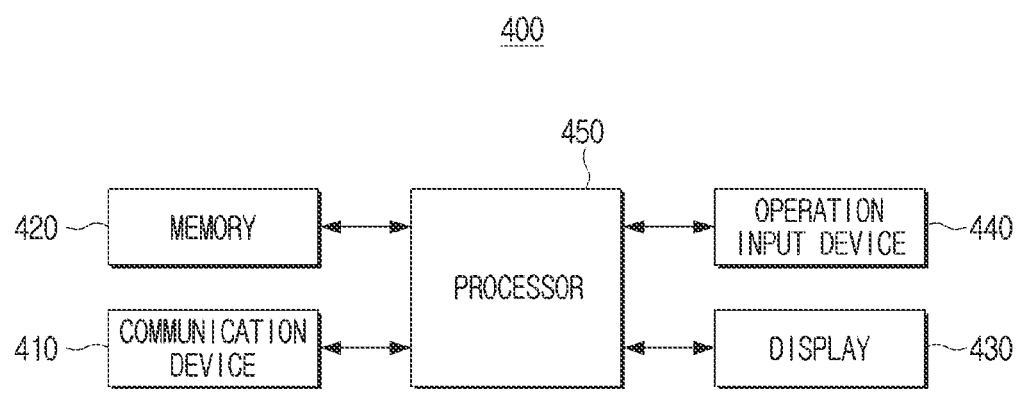
FIG. 2 is a block diagram illustrating a configuration of an operation device according to an embodiment of the disclosure.

FIG. 2 is a block diagram illustrating a configuration of an operation device according to an embodiment of the disclosure.

In detail, in the system of FIG. 1, the devices that perform homomorphic encryption, such as the first electronic device and the second electronic device, the device that arithmetically operates the homomorphic cipher text, such as the first server device or the like, the device that decrypts the homomorphic cipher text, such as the second server device, and the like may be referred to as operation devices. The operation devices may include various devices such as a personal computer, a notebook computer, a smartphone, a tablet, a server, and the like Referring to FIG. 2, the operation device 400 may include a communication device 410, a memory 420, a display 430, an operation input device 440, and a processor 450.

The communication device 410 is provided to connect the operation device 400 to an external device (not shown), and here, the communication device 410 may be connected to an external device via a local area network (LAN) and the internet or may be connected to the external device through a universal serial bus (USB) port or a wireless communication (e.g., Wi-Fi 802.11a/b/g/n, NFC, Bluetooth) port. The communication device 410 may also be referred to as a transceiver.

The communication device 410 may receive a public key from an external device and transmit a public key generated by the operation device 400 itself to the external device.

The communication device 410 may receive a message from an external device and transmit a generated homomorphic cipher text to the external device.

In addition, the communication device 410 may receive various parameters necessary for generating a cipher text from an external device. Meanwhile, in the implementation, various parameters may be directly input from the user through the operation input device 440 to be described later.

In addition, the communication device 410 may receive a request for an operation on the homomorphic cipher text from the external device and transmit a calculated result to the external device.

The communication device 410 may receive a homomorphic ciphertext.

The memory 420 is an element to store operating system (O/S), various software, data, or the like, for driving the operation device 400. The memory 420 may be implemented in various forms such as a random access memory (RAM), a read-only memory (ROM), a flash memory, a hard disk drive (HDD), an external memory, a memory card, and the like, but is not limited thereto. [00n] The memory 420 may store a message to be encrypted. Here, the message may be various credit information, personal information, and the like quoted by the user or may be information related to a usage history such as location information and Internet usage time information used in the operation device 400.

The memory 420 may store a public key. If the operation device 400 is a device that directly generates a public key, the memory 420 may store various parameters necessary for generating a public key and a secret key, as well as the secret key.

In addition, the memory 420 may store a homomorphic cipher text generated in a process to be described later. In addition, the memory 420 may store intermediate data (e.g., a message vector, a polynomial message, etc.) in the process of generating the homomorphic ciphertext.

The memory 420 may store a homomorphic cipher text transmitted from an external device. In addition, the memory 420 may store an operation result cipher text which is a result of the operation as described later.

The memory 420 may store an approximate message that is a decryption result value for the homomorphic ciphertext. The memory 420 may store intermediate data (e.g., an approximation message in a vector form, an approximation message in a polynomial form, etc.) in the process of decrypting the homomorphic ciphertext.

The display 430 displays a user interface window for selecting a function supported by the operation device 400. Specifically, the display 430 may display a user interface window for selecting various functions provided by the operation device 400. The display 430 may be a monitor such as a liquid crystal display (LCD), an organic light emitting diode (OLED), or the like, or may be implemented as a touch screen capable of simultaneously performing a function of the operation input device 440 to be described later.

The display 430 may display a message requesting input of a parameter required for generating a secret key and a public key. In addition, the display 430 may display a message in which an encryption target selects a message. Meanwhile, when implemented, the encryption target may be directly selected by the user or may be automatically selected. That is, personal information requiring encryption may be automatically set even if the user does not directly select a message.

The operation input device 440 may receive selection of a function of the operation device 400 and a control command for the corresponding function from the user. Specifically, the operation input device 440 may receive a parameter required for generating a secret key and a public key from the user. In addition, the operation input device 440 may receive a message to be encrypted from the user.

The processor 450 controls each configuration of the operation device 400. The processor 450 may be configured as a single device such as a central processing unit (CPU) or an application-specific integrated circuit (ASIC) or may include a plurality of devices such as the CPU and a graphics processing unit (GPU).

When a message to be transmitted is input, the processor 450 stores the message in the memory 420. The processor 450 may homomorphically encrypt the message using various set values and programs stored in the memory 420. In this case, the public key may be used.

The processor 450 may generate a public key required for performing encryption by itself and use the public key or may receive the public key from an external device and use the same. For example, the second server device 300 that performs decryption may distribute the public key to other devices.

When generating a key by itself, the processor 450 may generate the public key using a Ring-LWE technique. Specifically, the processor 450 may first set various parameters and rings and store the set parameters and rings in the memory 420. Examples of parameters may include a length of bits of a plain text, sizes of the public key and the secret key, and the like.

The ring may be expressed by the following equation.

$$R = Z_q[X]/(f(X)) \qquad \text{[Equation 2]}$$

Here R denotes a ring, Zq denotes a coefficient, and f(x) is an $n^{th}$ order polynomial.

The ring, as a set of polynomials with predetermined coefficients, refers to set in which addition and multiplication are defined between elements and which is closed for addition and multiplication. Such a ring may be referred to as a ring.

As an example, the ring refers to a set of $n^{th}$ polynomials whose coefficient is Zq. Specifically, the ring refers to N-th cyclotomic polynomial when n is Φ(N). (f(x)) denotes an ideal of Zq[x] produced by f(x). The Euler's totient function Φ(N) refers to the number of natural numbers which are relatively prime with N and smaller than N. If $\Phi_M(N)$ is defined as the N-th cyclotomic polynomial, the ring may also be expressed as Equation 3 below.

$$R = Z_q[x]/(\Phi_N(x)) \qquad \text{[Equation 3]}$$

The secret key (sk) may be represented as follows.

Meanwhile, the ring of Equation 3 described above has a complex number in a plain text space. Meanwhile, in order to improve an operation speed for the homomorphic cipher text, only a set in which the plain text space is a real number, in the set of the ring described above, may also be used.

When the ring is established, the processor 450 may calculate a secret key sk from the ring.

$$sk \leftarrow (1, s(x)), s(x) \in R \qquad \text{[Equation 4]}$$

Here, s(x) denotes a polynomial generated randomly with a small coefficient.

The processor 450 calculates a first random polynomial a(x) from the ring. The first random polynomial may be expressed as follows.

$$a(x) \leftarrow R \qquad \text{[Equation 5]}$$

In addition, the processor 450 may calculate an error. Specifically, the processor 450 may extract an error from a discrete Gaussian distribution or a distribution having a statistical distance close thereto. This error may be expressed as follows.

$$e(x) \leftarrow D_{\alpha q}^{n} \quad \text{[Equation 6]}$$

When the error is calculated, the processor 450 may calculate a second random polynomial by performing a modular operation on the first random polynomial and the secret key error. The second random polynomial may be expressed as follows.

$$b(x) = -a(x)s(x) + e(x) \pmod{q} \quad \text{[Equation 7]}$$

Finally, the public key pk is set in a form including the first random polynomial and the second random polynomial as follows.

$$pk = (b(x), a(x)) \quad \text{[Equation 8]}$$

The method of generating the key described above is merely an example, and thus the disclosure is not limited there and the public key and the secret key may be generated in other ways.

If the public key is generated, the processor 450 may control the communication device 410 to transmit the public key to other devices.

The processor 450 may generate a homomorphic cipher text for the message. In this example, the processor 450 may perform an encoding operation of converting the message into a polynomial in advance. The processor 450 may perform encoding using a canonical embedding function, and in order to speed up the operation, encoding may be performed using a function having a size half that of the existing embedding function. A detailed encoding operation will be described later with reference to FIG. 3.

The processor 450 may generate a ciphertext using the public key pk=(b(x),a(x)) and the following Equation for the message transformed to the message form.

$$C_{txt} = (v \cdot b(x) + \Delta \cdot M + e_0, v \cdot a(x) + e_1) \in R \times R \quad \text{[Equation 9]}$$

Here, the processor 450 may generate the cipher text to have a length corresponding to a size of a scaling factor.

The message to be encrypted may be received from an external source or may be input from an input device directly provided or connected to the terminal device 100. Also, the scaling factor may be directly input by the user or may be provided through another device. For example, when the terminal device 100 includes a touch screen or a keypad, the processor 450 may store data input by the user through the touch screen or the keypad in the memory 420 and then encrypt the data.

When the generated homomorphic ciphertext is decrypted, it may be restored as a result value obtained by adding an error to a value reflecting the scaling factor in the message. The scaling factor which was input in advance and set may be used as it is.

Meanwhile, according to an embodiment of the disclosure, packing may be performed. The use of packing in homomorphic encryption makes it possible to encrypt multiple messages in a single cipher text. In this case, when an operation is performed between the cipher texts in the first server device 200, an operation burden is significantly reduced because the operation is performed on a plurality of messages in parallel. The packing operation will be described with reference to FIG. 3.

In addition, when the homomorphic ciphertext is generated, the processor 450 may control the communication device 410 to store the homomorphic ciphertext in the memory 420 or to transmit the homomorphic ciphertext to another device according to a user request or a preset default command.

When the homomorphic cipher text is required to be decrypted, the processor 450 may generate a polynomial decipher text by applying a secret key to the homomorphic cipher text and generate a message by decoding the polynomial decipher text. Here, the generated message may include an error as mentioned in Equation 1 described above. A specific decryption process and a decoding operation will be described below with reference to FIG. 3.

The processor 450 may perform an operation on the cipher text. Specifically, the processor 450 may perform an operation such as addition, or multiplication, while maintaining the encrypted state regarding the homomorphic cipher text. Specifically, the processor 450 may process each homomorphic ciphertext to be used for the operation with a first function, perform an operation such as addition or multiplication between the homomorphic ciphertexts processed with the first function, and process the calculated homomorphic ciphertext as second function which is an inverse function of the first function. For the first function processing and the second function processing, a linear transformation technology in a bootstraping process to be described later may be used.

When the operation is completed, the operation device 400 may detect data of a valid area from operation result data. Specifically, the operation device 400 may perform a rounding process on the operation result data to detect data of a valid area. The rounding process refers to round-off of a message in an encrypted state. Alternatively, the rounding process may also be referred to as rescaling. Specifically, the operation device 400 may remove a noise region by multiplying and rounding off each component of the ciphertext by $\Delta^{-1}$ which is the reciprocal of the scaling factor. The noise region may be determined to correspond to the size of the scaling factor. As a result, it is possible to detect a message in the valid region from which the noise region is excluded. As this process has been performed in an encryption state, an additional error occurs, but the size is small enough and may be ignored.

In addition, when a portion of an approximation message in the operation result cipher text exceeds a threshold, the operation device 400 may perform a rebooting operation on the cipher text.

As described above, the operation device according to the disclosure may perform a decoding or encoding operation using a matrix having a size half smaller than that of the related art, and thus may perform a faster decoding operation or encoding operation. For example, the number of multiplications during decoding for homomorphic encryption with polynomial order of 17 is $2^{33}$ times and the number of multiplications during encoding is $2^{34}$ times, and if using the matrix having a half size according to the disclosure, performance improvement about approximately 5000 times is possible.

In illustrating and describing FIGS. 1 and 2, it has been illustrated and described that an encryption operation, that is, both an encoding and an encryption operation, is performed in one device, but in implementation, only the encoding operation may be performed in one device and another device may receive the encoding result and perform encryption. Also, in the decryption process, one device may perform both the decryption operation and the decoding operation, and two devices may separately perform the decryption operation and the decoding operation.

In addition, although it has been described that an asymmetric encryption method (i.e., a private key and a public key) is used in the illustration and description of FIGS. 1 and 2, encryption and decryption operations may be performed using a symmetric encryption method in implementation.

Figure 3:
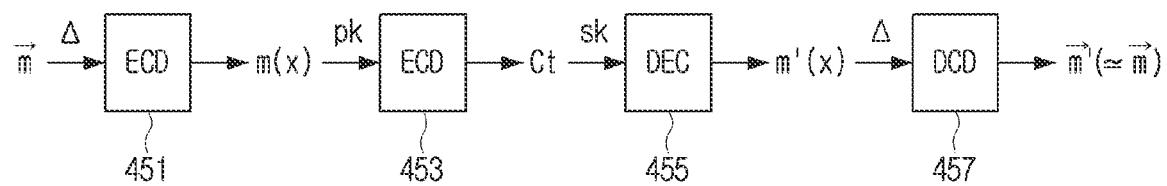
FIG. 3 is a diagram illustrating generating an approximate homomorphic ciphertext and decryption operation.

FIG. 3 is a diagram illustrating generating an approximate homomorphic ciphertext and decryption operation.

Referring to FIG. 3, the processor 450 may include an encoding module 451, an encryption module 453, a decryption module 455, and a decoding module 457.

When receiving a message, the encoding module 451 may convert the received message into a polynomial form and output the message. Here, outputting the polynomial type message means outputting the coefficients of the polynomial of the preset type, but in implementation, the polynomial itself may be output.

If the scaling factor for the message is received, the encoding module 451 may output a polynomial as in Equation 10 below.

$$m(x) = \tau^{-1}(\lfloor \Delta \cdot \vec{m} \rceil_{\tau(R')}) \in R'$$

Here, $\vec{m} = (m_j)_{0 \leq j < n/2} \in R^{n/2}$, which is a message in the form of a vector. The m(x) is a message in the form of a polynomial, for example, in the form of $m(X) = m_0 + m_1 X + \ldots + m_{N-1} X^{N-1}$, it is an integer such that mi $\in [0, q-1]$. These values may be expressed as vectors of coefficients $(m_0, m_1, \ldots, m_{N-1})$. In addition, a message in the form of a polynomial may be referred to as a polynomial equation, and may have any one of the $7^{th}$ to $80^{th}$ orders.

Meanwhile, in the above, only one message is transformed into one polynomial, but in implementation, a plurality of messages may be transformed into one polynomial. This operation may be referred to as packing.

If packing is used in homomorphic encryption, it becomes possible to encrypt a plurality of messages into one ciphertext. In this example, when the operation device 400 performs an operation between each ciphertext, as a result, operations on a plurality of messages are processed in parallel, thereby greatly reducing the computational burden.

For example, when a message consists of a plurality of message vectors, the encoding module 451 may perform homomorphic encryption after converting the plurality of message vectors into a polynomial in a form that may be encrypted in parallel.

The encoding module 451 uses that the N-th cyclotomic polynomial $\Phi_N(x)$ has $\zeta_1, \overline{\zeta_1}, \ldots, \zeta_{n/2}, \overline{\zeta_{n/2}}$, (primitive N-th roots of unity) roots in a complex number (C) within different $n = \phi(N)$. By introducing the concept of a complex number, it is possible to homomorphically encrypt a plurality of messages at the same time as described above.

Next, the packing function (σ) may be calculated by transforming the canonical embedding function. The canonical embedding function is a function in which polynomial $M(x) \in R[x]/(\Phi_N(x))$ corresponds to the pair of values $M(\zeta_1), \ldots, M(\zeta_{n/2}) \in C^{n/2}$ in the (n/2) root $\zeta_1, \ldots, \zeta_{n/2}$, instead of a complex conjugate relation in the root $\zeta_1, \overline{\zeta_1}, \ldots, \zeta_{n/2}, \overline{\zeta_{n/2}}$ of $\Phi_N(x)$. The fact that this function is a homomorphism may be easily proved by anyone with average knowledge in this field.

The canonical embedding function may be expressed as a matrix (C) as follows.

$$\begin{pmatrix} 1 & \zeta_1 & \cdots & \zeta_1^{n-1} \\ 1 & \zeta_2 & \cdots & \zeta_2^{n-1} \\ \vdots & \vdots & \ddots & \vdots \\ 1 & \zeta_{n/2} & \cdots & \zeta_{n/2}^{n-1} \end{pmatrix} \quad \text{[Equation 11]}$$

If the polynomial M(x) is expressed as a column vector of coefficients $M = (M_0, \ldots, M_{n-1})$, the polynomial M(x) may have a relationship of $C \cdot M = \sigma(M)$, that is, the following relationship, with the polynomial packing function $\sigma(M) = (\zeta_1), \ldots, (M(\zeta_{n/2}))$ $$\begin{pmatrix} 1 & \zeta_1 & \cdots & \zeta_1^{n-1} \\ 1 & \zeta_2 & \cdots & \zeta_2^{n-1} \\ \vdots & \vdots & \ddots & \vdots \\ 1 & \zeta_{n/2} & \cdots & \zeta_{n/2}^{n-1} \end{pmatrix} \begin{pmatrix} M_0 \\ M_1 \\ \vdots \\ M_{n-1} \end{pmatrix} = \begin{pmatrix} M(\zeta_1) \\ M(\zeta_2) \\ \vdots \\ M(\zeta_{n/2}) \end{pmatrix} \quad \text{[Equation 12]}$$

In the state in which the canonical embedding function is calculated in this way, the encoding module 451 may convert the message vectors into polynomials using the above-described canonical embedding function, when a plurality of (e.g., n/2) message vectors $$m = (m_0, \ldots m_{\frac{n}{2}-1}) \in C^{n/2}$$

are input $$M(x) = \sigma^{-1}(m) \quad \text{[Equation 13]}$$

The polynomial M(x) transformed in the way of Equation 13 satisfies the relationship such as $M(\zeta_i) = m$;

The elements of the above canonical embedding function are expressed as 1 to N, but the set may be expressed as $$\left\{ \zeta_j \mid \zeta_j = \left(e^{\frac{2\pi i}{2N}}\right)^{5^j} (j = 0, 1, \ldots, N/2 - 1) \right\}.$$

In this example, the matrix U used for DFT and iDFT may be expressed as follows.

$$U = \begin{bmatrix} 1 & \zeta_0 & \cdots & \cdots & \zeta_0^{N-2} & \zeta_0^{N-1} \\ 1 & \zeta_1 & \cdots & \cdots & \zeta_1^{N-2} & \zeta_1^{N-1} \\ \vdots & \vdots & \cdots & \cdots & \vdots & \vdots \\ 1 & \vdots & \cdots & \cdots & \vdots & \vdots \\ 1 & \zeta_{N/2-2} & \cdots & \cdots & \zeta_{N/2-2}^{N-2} & \zeta_{N/2-2}^{N-1} \\ 1 & \zeta_{N/2-1} & \cdots & \cdots & \zeta_{N/2-1}^{N-2} & \zeta_{N/2-1}^{N-1} \end{bmatrix} N/2 \quad \text{[Equation 14]}$$

In this case, the DFT may be defined as a vector $C^{N/2}$ of a complex number having the number of N/2 in the polynomial m(x) which is an element of $R[x]/(X^N+1)$.

When a one-dimensional vector $\vec{m}$ is defined as coefficients of m(X), a complex vector z of size N/2, which is a result of DFT, may be calculated using Equation 15 below.

$$z \leftarrow U \cdot \vec{m}^R \quad \text{[Equation 15]}$$

iDFT is a meth of calculating a vector $\vec{m} = (m_0, m_1, \ldots, m_{N-1})$ containing the coefficients of the polynomial m(x) from the complex vector z and may be calculated in the following method.

$$CRT \leftarrow \begin{pmatrix} U \\ \overline{U} \end{pmatrix}_{(N \times N)} \quad \text{[Equation 16]}$$

Here, $\overline{U}$ is a matrix of all elements of U conjugated $$\vec{m} \leftarrow CRT^{-1}\left(\frac{z}{z}\right) \qquad \text{[Equation 17]}$$

Since the encoding process or the decoding process must perform multiplication as much as the size of the matrix as described above, a large number of complex multiplications are required in a large homomorphic encryption environment in which the polynomial degree is N.

For example, if $N=2^{17}$ is used, the number of multiplications requires $2^{33}$ (in decoding) or $2^{34}$ (in encoding).

Accordingly, if the size of the matrix may be reduced, the number of multiplications in the encoding process or the decoding process may be reduced. Accordingly, in the disclosure, encoding or decoding is performed using a matrix having only half the elements of the canonical embedding function as shown in Equation 18.

$$U_H = \begin{bmatrix} 1 & \zeta_0 & \cdots & \cdots & \zeta_0^{N/2-2} & \zeta_0^{N/2-1} \\ 1 & \zeta_1 & \cdots & \cdots & \zeta_1^{N/2-2} & \zeta_1^{N/2-1} \\ \vdots & \vdots & \cdots & \cdots & \vdots & \vdots \\ 1 & \vdots & \cdots & \cdots & \vdots & \vdots \\ 1 & \zeta_{N/2-2} & \cdots & \cdots & \zeta_{N/2-2}^{N/2-2} & \zeta_{N/2-2}^{N/2-1} \\ 1 & \zeta_{N/2-1} & \cdots & \cdots & \zeta_{N/2-1}^{N/2-2} & \zeta_{N/2-1}^{N/2-1} \end{bmatrix} N/2 \qquad \text{[Equation 18]}$$

This matrix $U_H$ is a matrix having only the left half of the canonical embedding function, and has half the same number of rows and half the number of columns of the related-art canonical embedding function.

When using the matrix, the function $\tau$ and $\tau^{-1}$ may be defined as follows.

$$\tau(\vec{m})=U_H \cdot \vec{m}\vec{m}'=(m_0+i^*m_{N/2}, \ldots, m_j+i^*m_{N/2+j}, \ldots)(j=0, \ldots, N/2-1) \qquad \text{[Equation 19]}$$

Here, $m_i$ is the coefficient of a polynomial $m(X)=m_0+m_1 x + \ldots$ $$\tau^{-1}(\vec{z})=U_H^{-1}\cdot\vec{v} \qquad \text{[Equation 20]}$$

Here, $U_H^{-1}=(1/(N/2))^*\overline{U_H}^T$.

For the same reason as Equations 19 and 20, $U_H$, $U_H^{-1}$ may be used when calculating $\tau$ and $\tau^{-1}$. Specifically, the matrix values in the matrix corresponding to the canonical embedding function may be expressed as in Equation 21, where each matrix value has the same absolute value in a predetermined period. For example, with a period of 5, the magnitude is the same and the sign value is changed. In this regard, an encoding or decoding operation may be performed using a matrix having only the left half of the canonical embedding function.

For reasons of Equations 21 to 24 below, FFT and iFFT may be applied when calculating $\tau$ and $\tau^{-1}$ using DTF. For example, the above-described matrix calculation may be used using the Cooley-Tukey FFT algorithm.

$$\zeta_k^j = \left(e^{2\pi i/2N}\right)^{(5^k \bmod 2N)j} = \left(e^{2\pi i/2N}\right)^{(4k+1)j} \qquad \text{[Equation 21]}$$

$$\zeta_{k+\frac{N}{4}}^j = \left(e^{2\pi i/2N}\right)^{4\left(k+\frac{N}{4}+1\right)j} = -\left(e^{2\pi i/2N}\right)^{(4k+1)j} \qquad \text{[Equation 22]}$$

$$\zeta_k^j = \left(e^{2\pi i/\frac{2N}{2}}\right)^{(4k+1)(j/2)} \text{(where } j \text{ is an odd number)} \qquad \text{[Equation 23]}$$

$$U_H^{-1} = \frac{1}{\frac{N}{2}} \overline{U}_H^T \qquad \text{[Equation 24]}$$

In addition, when calculating such a matrix, when calculating $\tau$ and $\tau^{-1}$ using DTF, FFT and iFFT may be applied. For example, if the complexity is $O(N^2)$ when using the existing matrix U, when using the matrix U H according to the disclosure, the complexity $O(N \log N)$ is reduced and if $N=2^{17}$, performance improvement of approximately 5000 times may occur.

Thereafter, a scaling factor may be applied to the message transformed to a polynomial. In this case, a scaling factor may be applied by multiplying a scaling vector for each coefficient of the transformed polynomial.

The encryption module 453 may receive a polynomial type message and generate a homomorphic cipher text by reflecting the public key to the received message. Specifically, the homomorphic cipher text may be generated using Equation 25 as follows.

$$V \cdot pk+(m+e_0, e_1)(\bmod q_L) \qquad \text{[Equation 25]}$$

Here, v is an element selected according to Xenc, and e0 and e1 are also error values selected according to Xerr.

The decryption module 455 may receive the cipher text and the secret key, decrypt the cipher text, and output a message including an error (hereinafter, an approximate message). Specifically, when the input cipher text is $ct=(c_0, c_1) \in R'_{q_i}^2$, the decryption module 455 may output a message like $m'=c_0+c_1 \cdot s(\bmod q_i)$ The message output from the decryption module 455 is a polynomial type message, and a message may be finally output based on the message output from the decryption module 455 and the scaling factor.

When the polynomial message satisfies $m(x) \in R'$ the decryption module 455 may output a message like $\vec{m}=(m_j=\Delta^{-1} \cdot m(\zeta_j))_{o \leq j < n/}2 \in R^{n/}2$. The decryption module 455 may perform the DFT operation using a matrix such as Equation 15 having only half the elements of the canonical embedding function as described above.

Meanwhile, in the illustrated example, the processor 450 has been illustrated and described as including all four modules, but may include only an encoding module and an encryption module or only a decryption module and a decoding module when implemented. In implementation, only one module among the four modules may be included.

Figure 4:
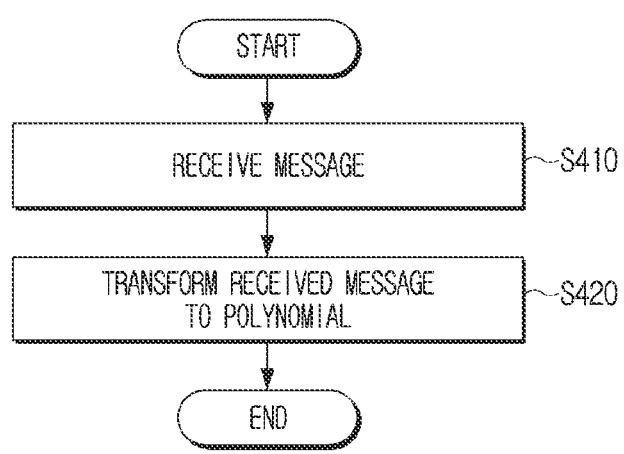
FIG. 4 is a flowchart illustrating encoding of the disclosure.

FIG. 4 is a flowchart illustrating encoding of the disclosure.

Referring to FIG. 4, a message is received in operation S410. Specifically, the message may be received by an external device, and may be information generated by the operation device itself. Here, the message may have a vector form.

The received message is transformed into a polynomial in operation S420. For example, the coefficients of the polynomial may be determined using a predefined matrix having only half the elements of the matrix corresponding to the canonical embedding function.

When a message is composed of a plurality of message vectors, the plurality of vectors may be transformed into a single polynomial during polynomial transformation. If scaling is required for the message, a scaling factor may be multiplied for each coefficient of the transformed polynomial.

The transformed polynomial may be output. For example, the polynomial may be generated as a homomorphic ciphertext using the above-described public key.

As described above, in the encoding method according to the embodiment, since Inverse Discrete Fourier Transform (iDFT) is performed using a reduced matrix compared to the related art, computational complexity may be reduced, and thus, the operation speed may be improved.

Figure 5:
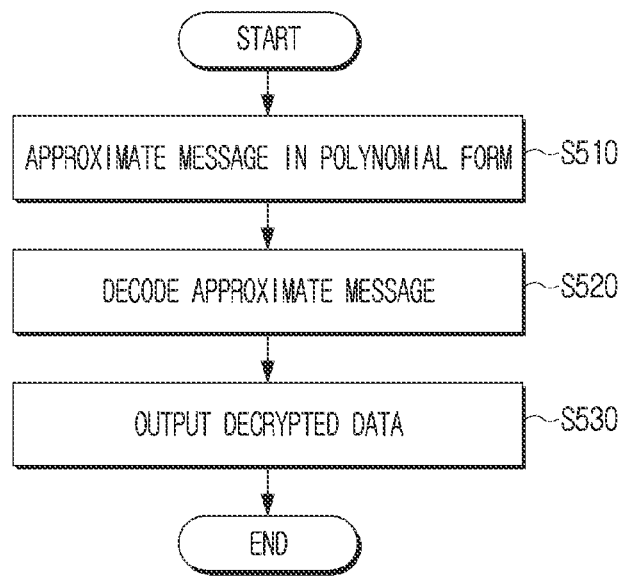
FIG. 5 is a flowchart illustrating decoding of the disclosure.

FIG. 5 is a flowchart illustrating decoding of the disclosure.

Referring to FIG. 5, a polynomial approximation message decrypted with a secret key is received. In this case, when the scaling factor is applied to the received message, the operation of dividing the scaling factor for the received message may be performed in advance.

The received polynomial approximation message is decoded in operation S520. For example, decoding may be performed using a predefined matrix having only half the elements of a matrix corresponding to a canonical embedding function.

The decrypted data is output in operation S530.

As described above, in the decoding method according to the embodiment, since Discrete Fourier Transform (DFT) is performed using a reduced matrix compared to the related art, computational complexity may be reduced, and thus, the operation speed may be improved.

Meanwhile, the method of processing a cipher text according to various embodiments described above may be implemented in the form of a program code for performing each step and may be stored in a recording medium and distributed. In this case, a device in which the recording medium is mounted may perform the operations such as encryption, cipher text processing, or the like described above.

The recording medium may be various types of computer-readable mediums such as ROM, RAM, memory chip, memory card, external hard disk, hard disk, CD, DVD, magnetic disk, or magnetic tape.

While the disclosure has been described with reference to the accompanying drawings, it is to be understood that the scope of the disclosure is defined by the claims described hereinafter and should not be construed as being limited to the above-described embodiments and/or drawings. It is to be clearly understood that improvements, changes, and modifications that are obvious to those skilled in the art are also within the scope of the disclosure as defined in the claims.

What is claimed is:

1. A method of electronic apparatus for encoding, the method comprising:
   receiving a message using a communication circuit;
   transforming the received message to a polynomial using a processor, and
   encrypting the polynomial using the processor to generate a homomorphic ciphertext,
   wherein the transforming comprises determining a coefficient of the polynomial using a single second matrix having only a half of a first matrix corresponding to a canonical embedding function,
   wherein the second matrix has a same number of rows of the first matrix corresponding to the canonical embedding function and a half of columns of the first matrix corresponding to the canonical embedding function.

2. The method of claim 1, wherein the canonical embedding function is composed of a matrix value having a same size absolute value in a predetermined period.

3. The method of claim 1, wherein the canonical embedding function is composed of a matrix value satisfying Equation of $\zeta_k^j = (e^{2\pi i/2N})^{(5^k \bmod 2N)}$,
   wherein $\zeta_k^j$ refers to a matrix value of (k-1, j-1) position, and N is a natural number.

4. The method of claim 1, wherein the transforming comprises determining the coefficient of the polynomial using inverse Discrete Fourier Transform (iDFT).

5. The method of claim 1, further comprising:
   multiplying a scaling factor to the transformed polynomial.

6. The method of claim 1, wherein the message is a plurality of message vectors, and
   wherein the transforming to the polynomial comprises transforming the plurality of message vectors to one polynomial.

7. A method of electronic apparatus for decoding encoding, the method comprising:
   decrypting, by a processor, a homomorphic ciphertext using a secret key to receive an approximate message in a polynomial form;
   decoding, by the processor, the received approximate message in a polynomial form; and
   outputting an approximate message using a communication circuit,
   wherein the decoding comprises decoding using a single second matrix having only a half of an element of a first matrix corresponding to a canonical embedding function, and
   wherein the second matrix has a same number of rows of the first matrix corresponding to the canonical embedding function and a half of columns of the first matrix corresponding to the canonical embedding function.

8. The method of claim 7, wherein the canonical embedding function is composed of a matrix value having a same size absolute value in a preset period unit.

9. The method of claim 7, wherein the canonical embedding function is composed of a matrix value satisfying Equation of $\zeta_k^j = (e^{2\pi i/2N})^{(5^k \bmod 2N)}$,
   wherein $\zeta_k^j$ refers to a matrix value of (k-1, j-1) position, and N is a natural number.

10. The method of claim 7, wherein the decoding comprises transforming a polynomial coefficient to an approximate message using Discrete Fourier Transform (DFT).

11. The method of claim 7, further comprising:
    dividing a scaling factor for the received approximate message,
    wherein the decoding comprises decoding an approximate message in which a scaling vector is divided.

12. An electronic apparatus comprising:
    a communication device to communicate with an external device, having a communication circuit;
    a memory storing at least one instruction; and
    a processor configured to execute the at least one instruction,
    wherein the processor, by executing the at least one instruction, is further configured to, (i) perform encoding on a message to generate an approximate message and encrypt the approximate message to generate an approximate homomorphic cipher text or (ii) decrypt the approximate homomorphic ciphertext to receive the approximate message and perform decoding the decrypted approximate message, using a single second matrix having only a half of an element of a first matrix corresponding to a canonical embedding function,
    wherein the second matrix has a same number of rows of the first matrix corresponding to the canonical embedding function and a half of columns of the first matrix corresponding to the canonical embedding function.

13. The electronic apparatus of claim 12, wherein the canonical embedding function is composed of a matrix value having a same size absolute value in a predetermined period.

14. The electronic apparatus of claim 12, wherein the canonical embedding function is composed of a matrix value satisfying Equation of $\zeta_k^j = (e^{2\pi i/2N})^{(5^k mod 2N)}$, wherein $\zeta_k^j$ refers to a matrix value of (k-1, j-1) position, and N is a natural number.

15. The electronic apparatus of claim 12, wherein the processor transforms the message to a polynomial and multiplies a scaling factor to a coefficient of the polynomial.

16. The electronic apparatus of claim 12, wherein the message is a plurality of message vectors, and wherein the processor transforms the plurality of message vectors to one polynomial.

17. The electronic apparatus of claim 12, wherein the processor performs encoding to transform a received message to a polynomial using inverse Discrete Fourier Transform (iDFT), and performs a polynomial coefficient to an approximate message using Discrete Fourier Transform (DFT).

* * * * *